(12) United States Patent
Sogawa et al.

(10) Patent No.: US 11,308,479 B2
(45) Date of Patent: Apr. 19, 2022

(54) AUTOMATICALLY SPECIFYING ALTERNATIVE SERVICES FOR SETTLING ELECTRONIC PAYMENTS

(71) Applicant: Mercari, Inc., Tokyo (JP)

(72) Inventors: Keisuke Sogawa, Tokyo (JP); Nobuaki Suzuki, Tokyo (JP)

(73) Assignee: Mercari, Inc., Tokyo (JP)

( * ) Notice: Subject to any disclaimer, the term of this patent is extended or adjusted under 35 U.S.C. 154(b) by 236 days.

(21) Appl. No.: 16/574,994

(22) Filed: Sep. 18, 2019

(65) Prior Publication Data

US 2020/0097945 A1 Mar. 26, 2020

(30) Foreign Application Priority Data

Sep. 20, 2018 (JP) .............................. JP 2018-176063

(51) Int. Cl.
  *G06Q 20/32* (2012.01)
  *G06K 7/10* (2006.01)
  *G06K 7/14* (2006.01)
  *G06Q 20/02* (2012.01)

(52) U.S. Cl.
  CPC ..... *G06Q 20/3274* (2013.01); *G06K 7/10722* (2013.01); *G06K 7/1417* (2013.01); *G06Q 20/02* (2013.01)

(58) Field of Classification Search
  CPC .............. G06Q 20/3274; G06Q 20/02; G06K 7/10722; G06K 7/1417
  See application file for complete search history.

(56) References Cited

U.S. PATENT DOCUMENTS

| 2010/0134278 | A1* | 6/2010 | Srinivasan | G06Q 30/02 340/539.13 |
| 2013/0262309 | A1* | 10/2013 | Gadotti | G06Q 20/322 705/44 |
| 2016/0203452 | A1 | 7/2016 | Bae | |

FOREIGN PATENT DOCUMENTS

| JP | 2004-318707 A | 11/2004 |
| JP | 2016-66194 A | 4/2016 |
| JP | 2016-534453 A | 11/2016 |

(Continued)

*Primary Examiner* — Bennett M Sigmond
*Assistant Examiner* — Marla Hudson
(74) *Attorney, Agent, or Firm* — Sterne, Kessler, Goldstein & Fox P.L.L.C.

(57) ABSTRACT

There is provided an information processing method performed by one or more processors of a first information processing device that executes predetermined settlement processing corresponding to a predetermined settlement service. The information processing method includes electronically acquiring, from a second information processing device that scans an information code used for settlement, information concerning the information code, electronically specifying one settlement service from a plurality of settlement services on the basis of the information concerning the information code, when the specified settlement service is the predetermined settlement service, executing the predetermined settlement processing on the basis of settlement information included in the information code; and, when the specified settlement service is another settlement service, transmitting the settlement information included in the information code to another information processing device that executes settlement processing corresponding to the other settlement service.

14 Claims, 12 Drawing Sheets

(56) References Cited

FOREIGN PATENT DOCUMENTS

| | | |
|---|---|---|
| JP | 2017-21742 A | 1/2017 |
| JP | 2017-215994 A | 12/2017 |
| WO | WO-2017-029824 A1 | 2/2017 |

* cited by examiner

FIG. 4

<PURCHASE HISTORY DB>

| DATE AND TIME | PAYING USER | PAYMENT DESTINATION (CHARGING USER) | SETTLEMENT SERVICE | PAYMENT AMOUNT | COMMODITY NAME/ SERVICE NAME | ... |
|---|---|---|---|---|---|---|
| 2018/5/20 | aaa | mm-1 | A | ¥1,000 | xxx | ... |
| 2018/5/20 | bbb | nn-1 | B | ¥2,000 | yyy | ... |
| 2018/5/21 | aaa | nn-2 | A | ¥500 | zzz | ... |
| 2018/5/22 | aaa | qq-1 | D | ¥600 | xxx | ... |
| 2018/5/23 | aaa | Mm-2 | C | ¥2,400 | zzz | ... |
| ... | ... | ... | ... | ... | ... | ... |

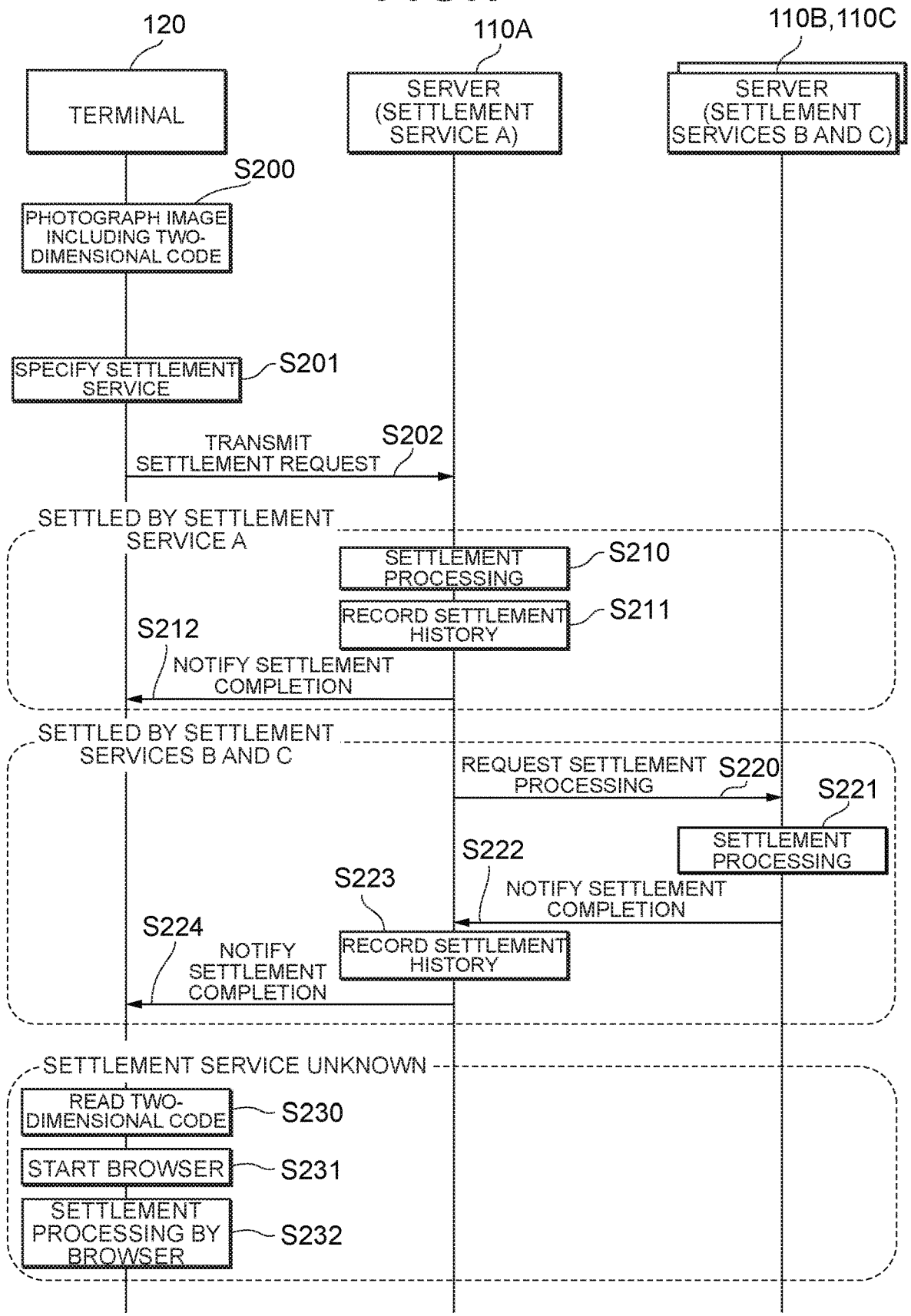

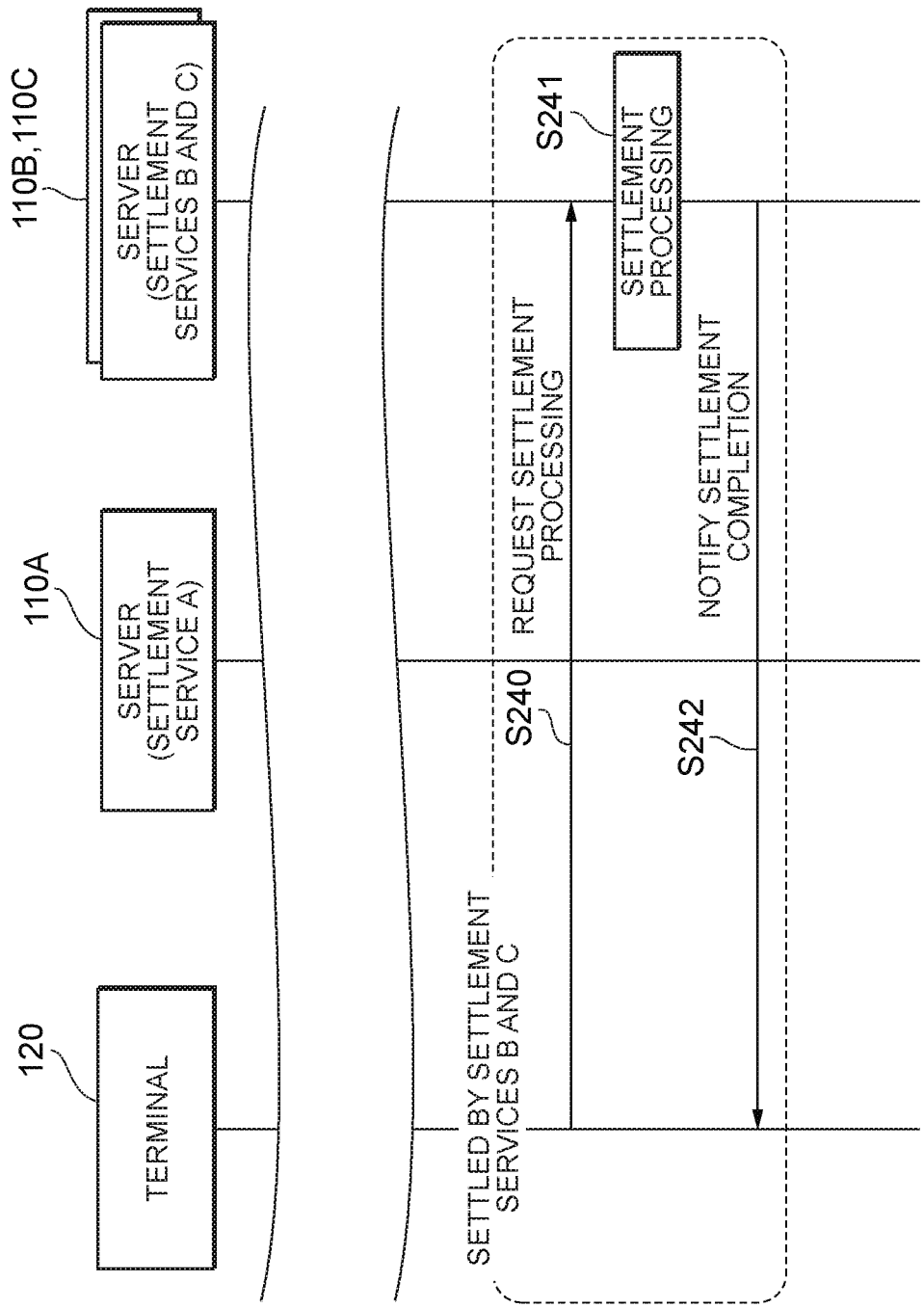

FIG.9A

| DATE AND TIME | PAYING USER | PAYMENT DESTINATION (CHARGING USER) | SETTLEMENT SERVICE | PAYMENT AMOUNT | COMMODITY NAME/SERVICE NAME | ... |
|---|---|---|---|---|---|---|
| 2018/5/20 | bbb | nn-1 | B | ¥2,000 | yyy | ... |
| 2018/5/24 | ccc | nn-1 | A | ¥1,000 | xxx | ... |
| 2018/5/25 | ddd | nn-1 | D | ¥1,000 | xxx | ... |
| 2018/5/26 | bbb | nn-1 | C | ¥2,000 | yyy | ... |
| 2018/5/25 | ddd | nn-1 | A | ¥500 | zzz | ... |
| ... | ... | ... | ... | ... | ... | ... |

FIG. 9B

| DATE AND TIME | PAYING USER | PAYMENT DESTINATION (CHARGING USER) | SETTLEMENT SERVICE | PAYMENT AMOUNT | COMMODITY NAME/SERVICE NAME | ... |
|---|---|---|---|---|---|---|
| 2018/5/20 | aaa | mm-1 | A | ¥1,000 | xxx | ... |
| 2018/5/21 | aaa | nn-2 | A | ¥500 | zzz | ... |
| 2018/5/22 | aaa | qq-1 | D | ¥600 | xxx | ... |
| 2018/5/23 | aaa | Mm-2 | C | ¥2,400 | zzz | ... |
| ... | ... | ... | ... | ... | ... | ... |

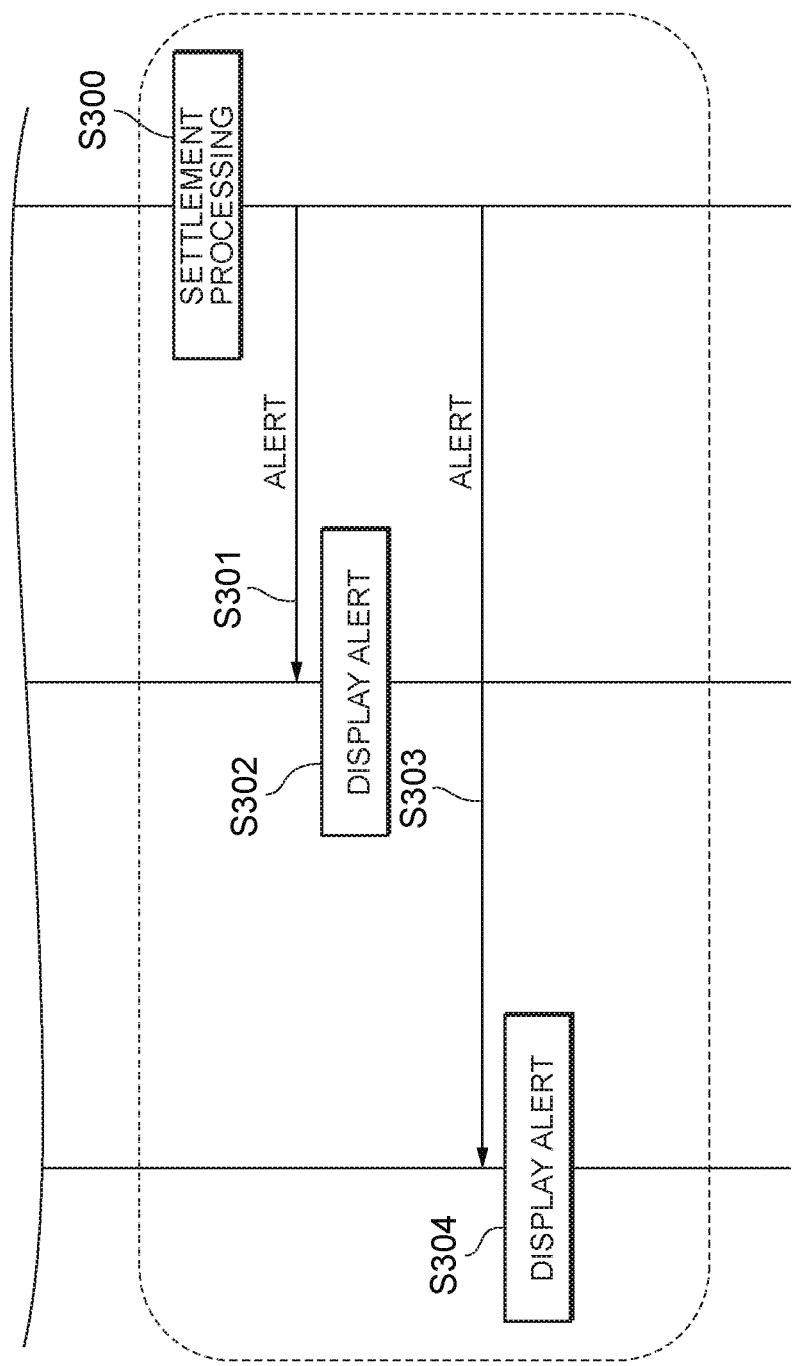

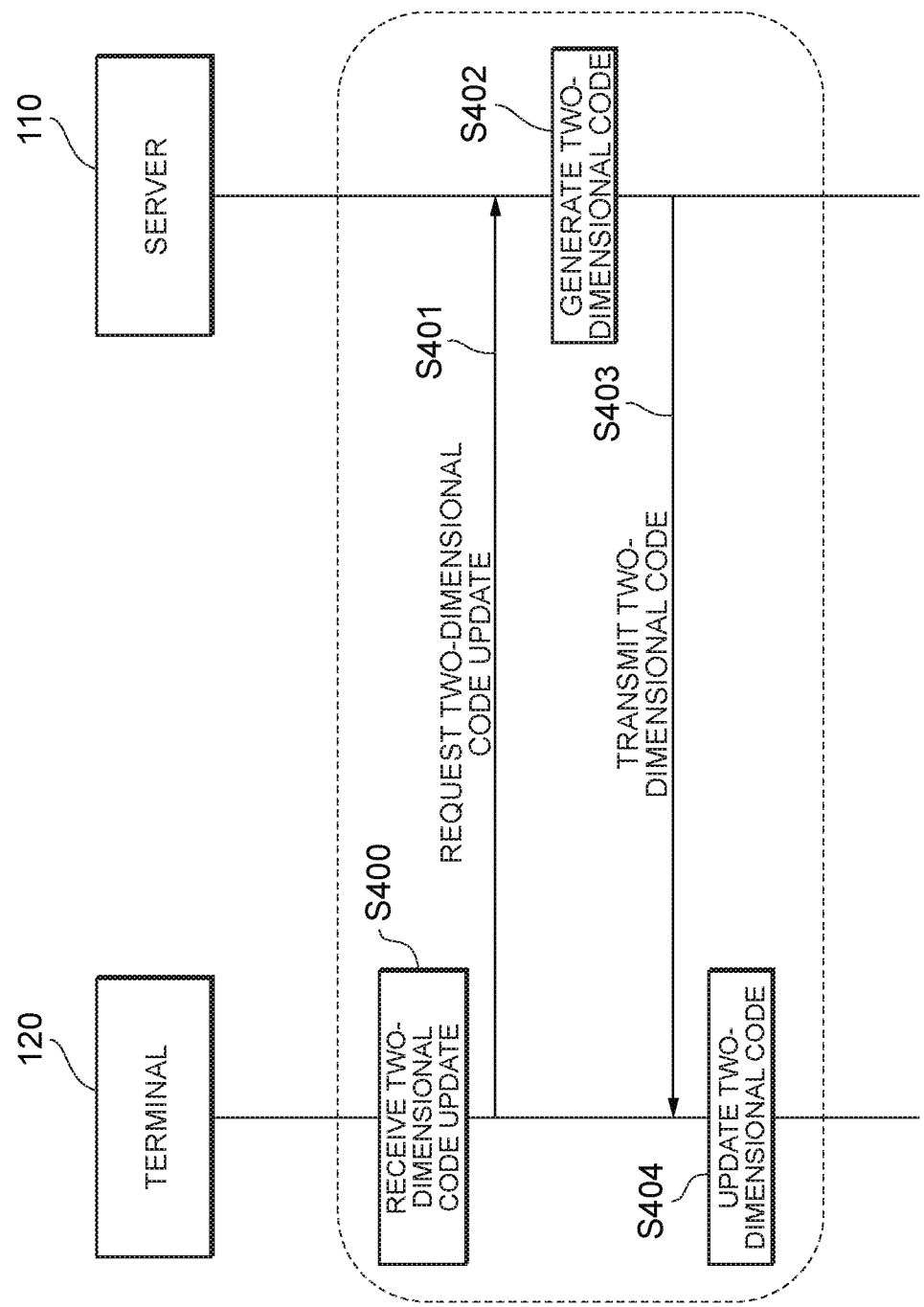

AUTOMATICALLY SPECIFYING ALTERNATIVE SERVICES FOR SETTLING ELECTRONIC PAYMENTS

CROSS REFERENCE TO RELATED APPLICATION

This application is based upon and claims priority from Japanese Patent Application No. 2018-176063 filed in Japan on Sep. 20, 2018, the entire contents of which are incorporated herein by reference.

BACKGROUND OF THE INVENTION

Field of the Invention

The present disclosure relates to an information processing method, an information processing device, and a computer-readable non-transitory storage medium storing a program.

Description of the Related Art

Currently, settlement means called QR code (registered trademark) settlement is provided. In the QR code (registered trademark) settlement, settlement is performed by reading, with a POS (Point of sales) terminal of a store, a QR code (registered trademark) displayed on a screen of a smartphone or reading, with the smartphone, a QR code (registered trademark) displayed in the store. National Publication of International Patent Application No. 2016-534453 (Patent Literature 1) discloses a technique for making it possible to more easily settle expenses of commodities using bar codes or QR codes (registered trademark).

In the current situation, various companies are starting provision of settlement services by QR codes (registered trademark). Therefore, when performing settlement in a storefront, a user needs to follow a procedure for determining a settlement service that the user desires to use out of a plurality of settlement services, starting an application corresponding to the determined settlement service of a company, and then performing settlement. Therefore, the settlement is considered to be extremely time-consuming.

SUMMARY OF THE INVENTION

An object of the present disclosure is to provide an information processing method, an information processing device, and a computer-readable non-transitory storage medium storing program that enables a user to easily perform settlement in a situation in which a plurality of settlement services by one-dimensional codes or two-dimensional codes are provided.

An information processing method according to an embodiment of the present disclosure is an information processing method performed by one or more processors of a first information processing device that executes predetermined settlement processing corresponding to a predetermined settlement service, the information processing method including: electronically acquiring, from a second information processing device that scans an information code used for settlement, information concerning the information code; electronically specifying one settlement service from a plurality of settlement services on the basis of the information concerning the information code; when the specified settlement service is the predetermined settlement service, executing the predetermined settlement processing on the basis of settlement information included in the information code; and, when the specified settlement service is another settlement service, transmitting the settlement information included in the information code to another information processing device that executes settlement processing corresponding to the other settlement service.

BRIEF DESCRIPTION OF THE DRAWINGS

FIG. 4 shows an example of a purchase history DB;

FIG. 7 shows an example of a sequence of processing performed by the communication system according to the embodiment;

FIG. 8 shows an example of the sequence of the processing performed by the communication system according to the embodiment;

FIG. 9A shows an example of statistical information concerning a purchase history;

FIG. 9B shows an example of statistical information concerning a purchase history;

FIG. 10 shows an example of operation processing in a second example; and

FIG. 11 shows an example of operation processing in a third example.

DETAILED DESCRIPTION OF THE PREFERRED EMBODIMENTS

Compliance

When the disclosure described in this specification is implemented, the disclosure is implemented while observing the laws of countries where the present disclosure is implemented. The disclosure described in this specification is implemented with all changes, substitutions, modifications, alterations, and corrections, which those skilled in the art can make, necessary for observing the laws of the countries.

Modes for carrying out a communication system according to the present disclosure are explained with reference to the drawings.

System Configuration

Figure 1:
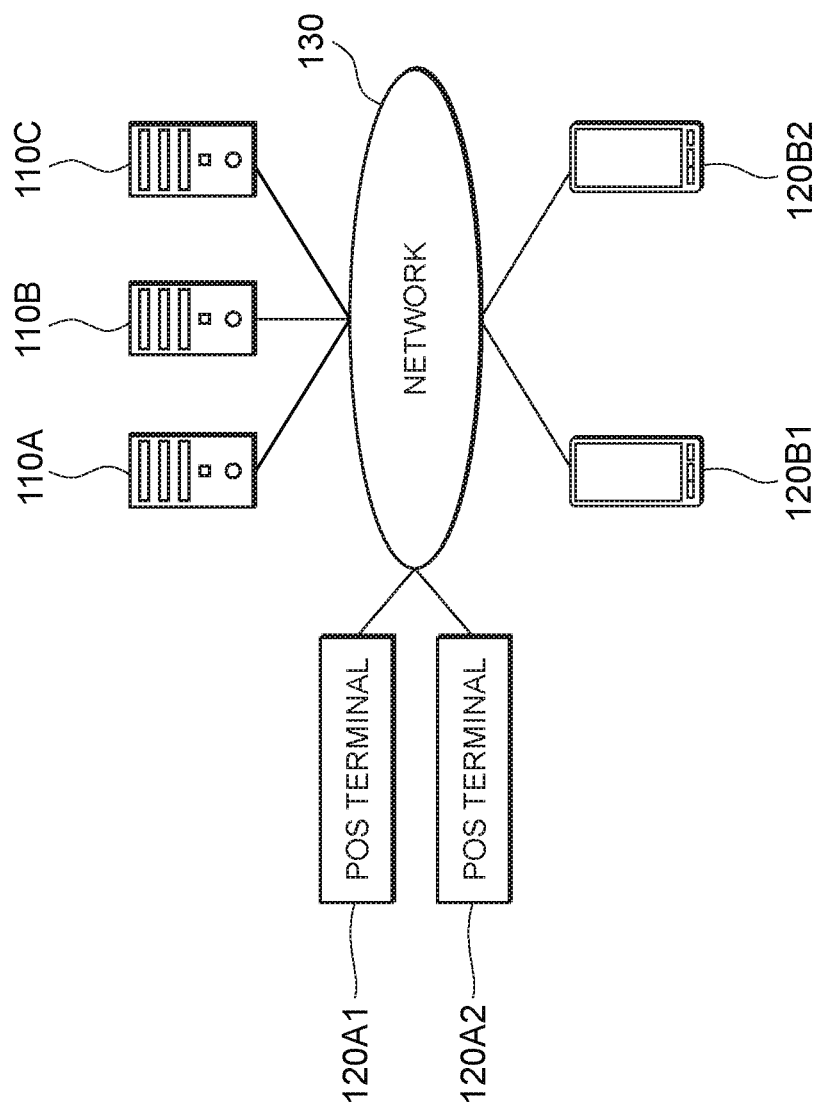
FIG. 1 shows the configuration of a communication system according to a form of an embodiment.

FIG. 1 shows the configuration of a communication system 1 according to an embodiment of the present disclosure. As disclosed in FIG. 1, in the communication system 1, a server 110A, a server 100B, a server 100C, a POS (Point of sales) terminal 120A1, a POS terminal 120A2, a user terminal 120B1, and a user terminal 120B2 are connected via a network 130.

In the present disclosure, when it is unnecessary to distinguish the server 110A, the server 110B, and the server 110C from one another, the server 110A, the server 110B, and the server 110C may be respectively represented as servers 110.

In the present disclosure, when it is unnecessary to distinguish the POS terminal 120A1 and the POS terminal 120A2 from each other, the POS terminal 120A1 and the POS terminal 120A2 may be respectively represented as POS terminals 120A. When it is unnecessary to distinguish the user terminal 120B1 and the user terminal 120B2 from each other, the user terminal 120B1 and the user terminal 120B2 may be respectively represented as user terminals 120B. When it is unnecessary to distinguish the POS terminal 120A and the user terminal 120B from each other, the POS terminal 120A and the user terminal 120B may be respectively represented as terminals 120.

In the present disclosure, when it is unnecessary to distinguish the servers 110 and the terminals 120 from each other, the servers 110 and the terminals 120 may be respectively represented as information processing devices 200. The number of the information processing devices 200 connected to the network 130 is not limited.

The servers 110 provide predetermined services to the terminals 120 used by users via the network 130. The predetermined services include, not as limitations but as examples, a settlement service, a financial service, an electronic commerce service, an SNS (Social Networking Service) represented by an instant messenger, and a content provision service of music, moving images, books, and the like. The users use the predetermined services via the terminals 120, whereby the servers 110 can provide the predetermined services to one or more terminals 120.

In the present disclosure, the settlement service means a service in which one or more users can exchange money or a money equivalent. The settlement service includes, not as limitations but as examples, services for performing settlement using a one-dimensional code (a barcode or the like), a two-dimensional code (a QR code (registered trademark) or the like), and short range wireless communication (NFC, BLE, WI-FI, ultrasound, or the like). According to necessity, in settlement using a one-dimensional code or a two-dimensional code, a user, who makes payment, (hereinafter represented as "paying user") performing settlement by reading a one-dimensional code or a two-dimensional code displayed on the POS terminal 120A using the user terminal 120B is represented as "user reading-type QR settlement". The paying user causing the user terminal 120B to display a one-dimensional code or a two-dimensional code and a user, who charges money or a money equivalent, (hereinafter represented as "charging user (or store)" performing settlement by reading the one-dimensional code or the two-dimensional code using the POS terminal 120A is represented as "store reading-type QR settlement".

According to necessity, a terminal used by a user X is represented as a terminal 120X. User information in the predetermined service associated with the user X or the terminal 120X is represented as user information X. The user information is information of a user associated with an account used by the user in the predetermined service. The user information includes, not as limitations but as examples, information associated with the user such as a name of the user, an icon image of the user, age of the user, sex of the user, an address of the user, interests and tastes of the user, and an identifier of the user, balance information of an electronic value (electronic money) associated with the user, and credit card information (a credit card number or the like) associated with the user input by the user or given by the predetermined service. The user information may be any one or a combination of these kinds of information.

The network 130 plays a role of connecting two or more information processing devices 200. The network 130 means a communication network that provides a connection route such that the terminals 120 can transmit and receive data after being connected to the servers 110.

One or a plurality of portions of the network 130 may be a wired network or a wireless network. The network 130 can include, not as limitations but as examples, an ad hoc network, an intranet, an extranet, a virtual private network (VPN), a local area network (LAN), a wireless LAN (WLAN), a wide area network (WAN), a wireless WAN (WWAN), a metropolitan area network (MAN), a part of the Internet, a part of a public switched telephone network (PSTN), a cellular phone network, ISDNs (Integrated Service Digital Networks), wireless LANs, an LTE (Long Term Evolution), a CDMA (Code Division Multiple Access), a Bluetooth (registered trademark), and satellite communication or a combination of two or more of the foregoing. The network 130 can include one or a plurality of networks.

The information processing device 200 may be any information processing device if the information processing device 200 is an information processing device that can realize processing, functions, and/or methods described in the present disclosure.

The information processing device 200 includes, not as limitations but as examples, a smartphone, a cellular phone (a feature phone), a computer (as not limitations but as examples, a desktop computer, a laptop computer, and a tablet computer), a server device, a media computer platform (not as limitations but as examples, a cable, a satellite set-top box, a digital video recorder, and the like), a hand-held computer device (not as limitations but as example, a PDA (Personal Digital Assistant), an electronic mail client, and the like), a wearable terminal (not as limitations but as examples, an eyeglass-type device, a watch-type device, and the like), other types of computers, or a communication platform.

Hardware (HW) Configuration

Figure 2:
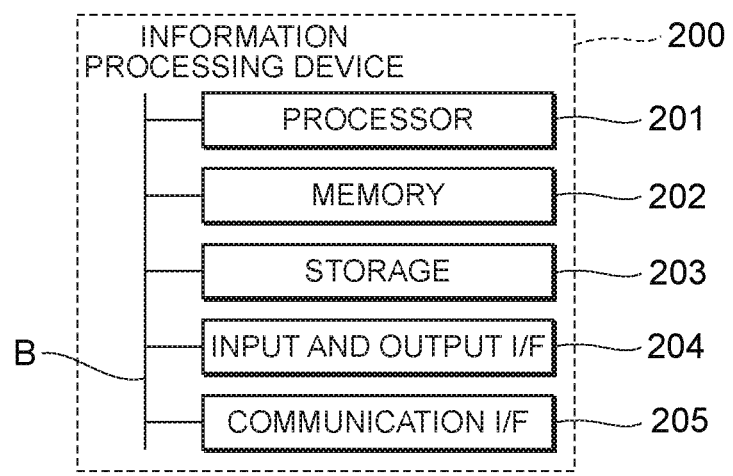
FIG. 2 shows an example of a hardware configuration of an information processing device according to the present disclosure.

An HW configuration of the information processing device 200 included in the communication system 1 is explained with reference to FIG. 2.

The information processing device 200 includes a processor 201, a memory 202, a storage 203, an input and output interface (input and output I/F) 204, and a communication interface (communication I/F) 205. The components of HW of the information processing device 200 are connected to one another, not as a limitation but as an example, via a bus B.

The information processing device 200 realizes the processing, the functions, and/or the methods described in the present disclosure according to cooperation of the processor 201, the memory 202, the storage 203, the input and output I/F 204, and the communication I/F 205.

The processor 201 executes processing, functions, and/or methods realized by codes or commands included in programs stored in the storage 203. The processor 201 includes, not as limitations but as examples, a central processing unit (CPU), an MPU (Micro Processing Unit), a GPU (Graphics Processing Unit), a microprocessor, a processor core, a multiprocessor, an ASIC (Application-Specific Integrated Circuit), and an FPGA (Field Programmable Gate Array). The processor 201 may realize respective kinds of processing disclosed in embodiments with a logic circuit (hardware) and a dedicated circuit formed in an integrated circuit (IC) chip, an LSI (Large Scale Integration), or the like. These circuits may be realized by one or a plurality of integrated circuits. A plurality of kinds of processing explained in the embodiments may be realized by one integrated circuit. The LSI is sometimes called VLSI, super LSI, ultra LSI, or the like according to a difference in a degree of integration.

The memory 202 temporarily stores a program loaded from the storage 203 and provides a work area to the processor 201. Various data generated while the processor 201 is executing the program are also temporarily stored in the memory 202. The memory 202 includes, not as limitations but as examples, a RAM (Random Access Memory) and a ROM (Read Only Memory).

The storage 203 stores programs. The storage 203 includes, not as limitations but as examples, a HDD (Hard Disk Drive), an SSD (Solid State Drive), and a flash memory.

The communication I/F 205 performs transmission and reception of various data via the network 130. The communication may be executed by either wire or radio. Any communication protocol may be used if mutual communication can be executed. The communication I/F 205 executes communication with the other information processing devices via the network 130. The communication I/F 205 transmits various data to the other information processing devices according to an instruction from the processor 201. The communication I/F 205 receives various data transmitted from the other information processing devices and transmits the data to the processor 201.

The input and output I/F 204 includes an input device that inputs various kinds of operation to the information processing device 200 and an output device that outputs a processing result of processing in the information processing device 200. In the input and output I/F 204, the input device and the output device may be integrated or may be separated.

The input device is realized by any one of all kinds of devices that can receive an input from the user and transmit information concerning the input to the processor 201 or a combination of the devices. The input device includes, not as limitations but as examples, hardware keys such as a touch panel, a touch display, and a keyboard, a pointing device such as a mouse, a camera (an operation input via an image), and a microphone (an operation input by voice).

The output device is realized by any one of all kinds of devices that can output a processing result of processing in the processor 201 or a combination of the devices. When the output device outputs the processing result as a video and/or a moving image, the output device is realized by any one of all kinds of devices that can display, according to display data written in a frame buffer, the display data or a combination of the devices. The output device includes, not as limitations but as examples, a touch panel, a touch display, a monitor (not as limitations but as examples, a liquid crystal display, an OELD (Organic Electroluminescence Display), and the like), a head mounted display (HMD), projection mapping, a hologram, a device capable of displaying an image, text information, and the like in the air (which may be vacuum), a speaker (sound output), and a printer. These output devices may be capable of displaying display data in 3D.

Programs in the embodiments of the present disclosure may be provided in a state in which the programs are stored in a computer-readable storage medium. The storage medium is capable of storing the programs in a "non-transitory tangible medium". The programs include, not as limitations but as examples, a software program and a computer program.

In an appropriate case, the storage medium can include one or a plurality of semiconductor-based or other integrated circuits (ICs) (not as limitations but as examples, a field programmable gate array (FPGA), an application specific IC (ASIC), and the like), a hard disk drive (HDD), a hybrid hard drive (HHD), an optical disk, an optical disk drive (ODD), a magneto-optical disk, a magneto-optical drive, a floppy diskette, a floppy disk drive (FDD), a magnetic tape, a solid-state drive (SSD), a RAM drive, a secure digital card or drive, any other appropriate storage medium, or an appropriate combination of two or more of the foregoing. In an appropriate case, the storage medium may be a volatile storage medium, a nonvolatile storage medium, or a combination of the volatile and nonvolatile storage medium.

A program of the present disclosure may be provided to the information processing device 200 via any transmission medium (a communication network, a broadcast wave, or the like) capable of transmitting the program.

The embodiments of the present disclosure can also be realized in a form of a data signal embedded in a carrier wave, the program being embodied in the data signal by electronic transmission.

The program of the present disclosure may be implemented using, not as limitations but as examples, script languages such as JavaScript (registered trademark) and Python, or programming languages such as a C language, a Go language, Swift, Kotlin, and Java (registered trademark), and the like.

At least a part of the processing in the information processing device 200 may be realized by cloud computing configured by one or more computers.

At least a part of the processing in the information processing device 200 may be performed by the other information processing devices. In this case, at least a part of processing realized by the processor 201 may be performed by the other information processing devices.

Others

Unless explicitly referred to otherwise, the configuration of the determination in the embodiments of the present disclosure is not essential. Predetermined processing may be operated when a determination condition is satisfied or the predetermined processing may be performed when the determination condition is not satisfied.

In the present disclosure, "or" has an inclusive meaning rather than an exclusive meaning unless clearly described otherwise or unless indicated otherwise by a context. Therefore, in the present disclosure, "A or B" means "A, B, or both of A and B" unless clearly described otherwise or unless indicated otherwise by a context. Further, "at least one of A and B" means "A, B, or both of A and B". Further, "a", "an", or "the" means "one or a plurality" unless clearly described otherwise or unless indicated otherwise by a context. Therefore, in this specification, "an A" or "the A" means "one or a plurality of As" unless particularly clearly described otherwise or unless indicated otherwise by a context.

The present disclosure includes all changes, substitutions, modifications, alternations, and corrections that those skilled in the art can make for the embodiments and/or examples of the present disclosure. Similarly, in an appropriate case, the appended claims include all changes, substitutions, modifications, alternations, and corrections that those skilled in the art can make for the embodiments and/or the examples of the present disclosure. Further, the present disclosure includes any combinations of one or a plurality of characteristics of the embodiments and/or the examples in the present disclosure and one or a plurality of characteristics of other embodiments and/or examples in the present disclosure that those skilled in the art can make.

In addition, reference in the appended claims to a device or a system or components of the device or the system that are adapted or disposed, have abilities, are configured, are usable, are operable, or can operate to implement specific processing, functions, and/or methods includes the device, the system, or the components irrespective of whether the device, the system, or the components or the specific processing, functions, and/or methods of the device, the system, or the components are activated, turned on, or unlocked as long as the device, the system, or the components are adapted or disposed, have abilities, are configured, are usable, are operable, or can operate in that way.

In the present disclosure, unless clearly described otherwise, in implementing all the embodiments or examples, consent may be acquired from a user beforehand or immediately before the implementation. The consent to be acquired may be comprehensive or may be acquired every time.

Embodiment

In this embodiment, it is assumed that the server 110 provides a settlement service using information codes including at least multi-dimensional codes such as a one-dimensional code, a two-dimensional code, and a three-dimensional code. It is assumed that the settlement service provided by the server 110 is different for each server 110. The difference of the settlement service includes, not as limitations but as example, at least one of a difference of a service name of the settlement service, a difference of processing content in settlement processing, and a difference of a processing procedure in the settlement processing.

For convenience of explanation, the following explanation is based on a settlement service using a two-dimensional code. However, the present disclosure is not limited to the embodiment described by using a two-dimensional code. This embodiment can also be applied to a settlement service using a one-dimensional code or a three-dimensional code.

In this embodiment, when the store reading-type QR settlement is performed, the server 110 or the user terminal 120B specifies, on the basis of information embedded in a two-dimensional code or on the basis of, for example, a characteristic of a figure or a character drawn around a two-dimensional code displayed (posted) on a screen of the user terminal 120B, a settlement service used for settlement and causes the server 110, which provides the specified settlement service, to execute settlement processing.

When the user reading-type QR settlement is performed, the server 110 or the POS terminal 120A specifies, on the basis of information embedded in a two-dimensional code or on the basis of, for example, a characteristic of a figure or a character draw around a two-dimensional code displayed (posted) in the store, a settlement service used for settlement and causes the server 110, which provides the specified settlement service, to execute settlement processing. The information embedded in the two-dimensional code and the characteristic such as the figure or the character drawn around the two-dimensional code are hereinafter collectively referred to as "information concerning an information code" as well.

According to this embodiment, a settlement service is automatically specified in a situation in which a plurality of settlement services by two-dimensional codes are provided from companies. Therefore, there is an effect that the paying user is capable of easily performing settlement without starting an application corresponding to a settlement service used for payment.

According to this embodiment, it is possible to prevent the user from performing useless operation for erroneously starting an application corresponding to a settlement service that cannot be used for payment in the store. Consequently, it is possible to prevent a situation in which an error occurs during payment processing and labor and time for starting an application corresponding to a correct settlement service occur. Consequently, it is possible to prevent CPUs and memory resources of the server 110 and the terminal 120 from being uselessly consumed.

According to this embodiment, a settlement service corresponding to a two-dimensional code read by the paying user is automatically selected. Therefore, the paying user is released from troublesome operation necessary in performing settlement using the two-dimensional code. It is possible to provide a smooth settlement service.

Configuration of this Embodiment.

Figure 3:
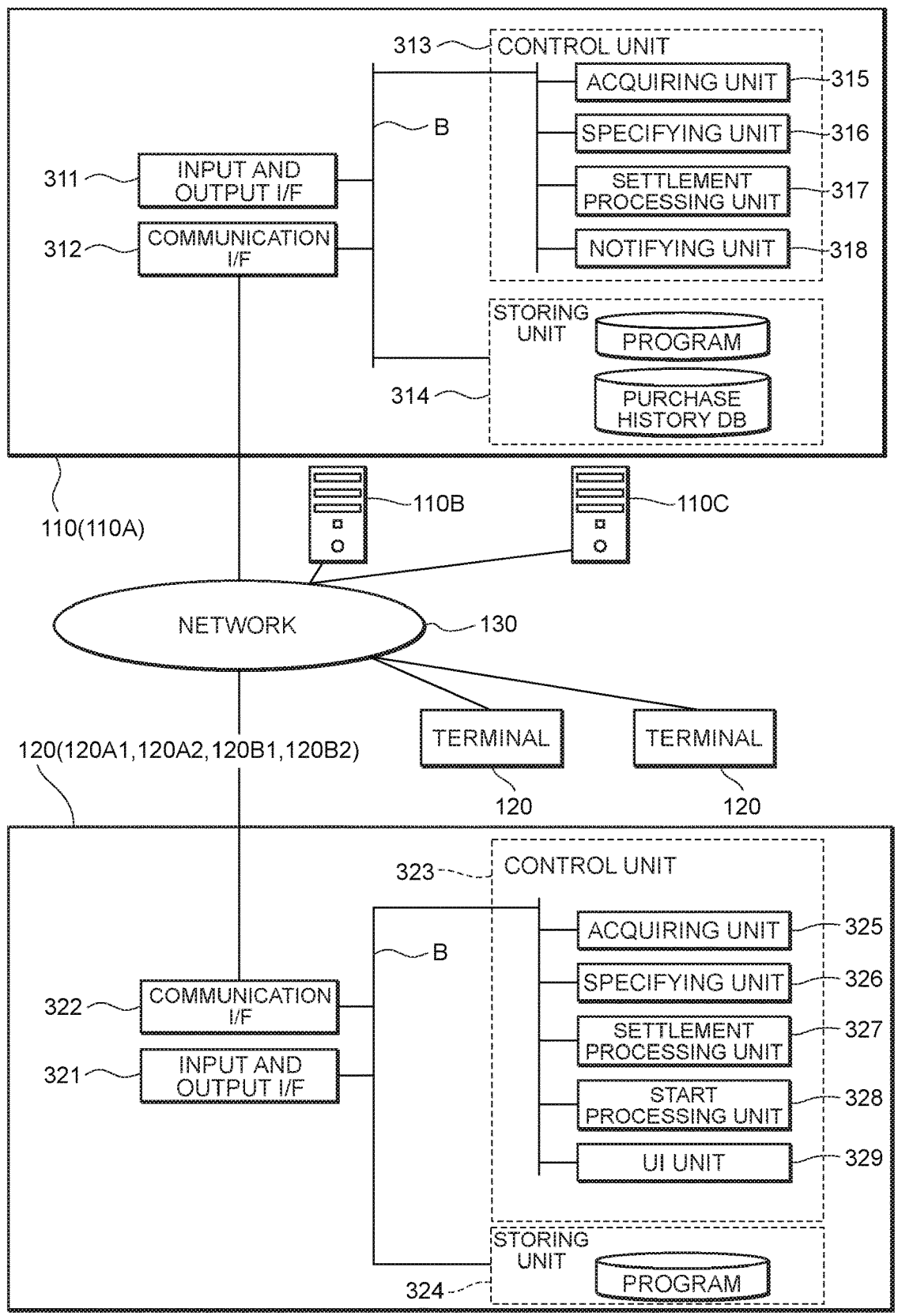
FIG. 3 shows an example of a block diagram showing the configuration of an information processing device according to the embodiment.

The configuration of the server 110 and/or the terminal 120 is explained with reference to FIG. 3. The server 110 and/or the terminal 120 is realized by cooperation of the processor 201, the memory 202, the storage 203, the input and output I/F 204, and the communication I/F 205 included in the information processing device 200.

(1) Configuration of the server

The server 110 includes an input and output I/F 311, a communication I/F 312, a control unit 313, and a storing unit 314. The input and output I/F 311 and the communication I/F 312 respectively correspond to the input and output I/F 204 and the communication I/F 205 shown in FIG. 2. The control unit 313 includes an acquiring unit 315, a specifying unit 316, a settlement processing unit 317, and a notifying unit 318. The storing unit 314 stores programs and a purchase history DB (database).

The acquiring unit 315 acquires, from the terminal 120, information concerning an information code used for settlement.

The specifying unit 316 specifies, on the basis of the information concerning the information code acquired by the acquiring unit 315, one settlement service used for settlement from a plurality of settlement services. For example, when the information concerning the information code is a character string obtained by reading a two-dimensional code on the terminal 120 side, the specifying unit 316 may specify, on the basis of a character string capable of specifying a settlement service included in the character string, one settlement service used for settlement. When the information concerning the information code is an image including a two-dimensional code and a character string capable of specifying a settlement service is included in the two-dimensional code, the specifying unit 316 may specify, on the basis of content of the character string obtained by reading (decoding) the two-dimensional code, one settlement service used for settlement. When the information concerning the information code is an image including a two-dimensional code, the specifying unit 316 may specify one settlement service used for settlement by analyzing presence or absence of characteristics corresponding to settlement services (for example, icons indicating names of the settlement services) included in an image acquired by the acquiring unit 315.

When the settlement service specified by the specifying unit 316 is a settlement service (a predetermined settlement service), settlement processing of which should be performed by the server 110 itself (a first information processing device), the settlement processing unit 317 performs the settlement processing using a character string (settlement information) obtained by decoding the two-dimensional code. On the other hand, when the settlement service specified by the specifying unit 316 is another settlement service, settlement processing of which should be performed by another server 110, the settlement processing unit 317 performs processing for transmitting the character string (the settlement information) obtained by decoding the two-dimensional code to the other server 110. The transmitting processing may be referred to as transmitting unit.

The settlement processing unit 317 may process the character string (the settlement information) included in the two-dimensional code according to specifications of the other settlement service and transmit the settlement information after being processed to the other server 110. It is assumed that, not as a limitation but as an example, only a partial character string of the character strings included in the two-dimensional code is used for the settlement processing according to specifications of the other settlement service. In this case, the settlement processing unit 317 may extract the partial character string from the character string included the two-dimensional code and transmit the partial character string to another server 110. The settlement processing unit 317 may retain specification data associated with each of settlement services, specify specification data corresponding to the settlement service specified by the specifying unit 316, and process the settlement information on the basis of the specification data.

When the settlement service specified by the specifying unit 316 is a settlement service (a predetermined settlement service), settlement processing of which should be performed by the server 110 itself (the first information processing device), the settlement processing unit 317 stores information concerning settlement in a purchase history DB. When the settlement service specified by the specifying unit 316 is another settlement service, settlement processing of which should performed by another server 110, the settlement processing unit 317 acquires, from the information included in the two-dimensional code or the other server 110, information concerning settlement performed using the settlement service and stores the information concerning the settlement in the purchase history DB.

When the settlement processing unit 317 cannot specify a settlement service used for settlement, the notifying unit 318 notifies the terminal 120 (a second information processing device) that a settlement service used for settlement cannot be specified. The predetermined processing may be, not as a limitation but as an example, processing in which the user terminal 120B starts a Web browser.

The notifying unit 318 may perform, in response to operation of the user performed on the terminal 120, processing for acquiring information concerning settlement from the purchase history DB and notifying the information concerning the settlement to the terminal 120. The information concerning the settlement notified to the terminal 120 is displayed on the screen of the terminal 120. The notifying unit 318 transmits the information displayed on the screen of the terminal 120 to the terminal 120. Therefore, the notifying unit 318 may be represented as a display control unit as well.

When receiving a request concerning the same settlement processing from the same terminal 120 a predetermined number of times within a predetermined time, the notifying unit 318 may notify the terminal 120 that the same settlement processing is performed the predetermined number of times within the predetermined time. For example, when the user performs operation for reading the same two-dimensional code many times because of some reason, the server 110 receives a request concerning the same settlement processing many times. In such a case, since the notification is performed, the user is capable of taking measures for, for example, updating the two-dimensional code and performing the settlement processing again.

FIG. 4 is a diagram showing an example of the purchase history DB. A date and time (a timestamp) when settlement is performed is stored in "date and time". Information for specifying a user (a paying user) who uses the settlement service is stored in "paying user". The information for specifying the paying user may be, not as a limitation but as an example, a name or a user ID of the user. Information for specifying a charging user, to whom payment is made by the settlement service, is stored in "payment destination (charging user)". The payment destination may be, not as a limitation but as an example, a store name or a store ID. Information for specifying a settlement service used for settlement is stored in "settlement service". The information may be, not as a limitation but as an example, a settlement service name, a company name that provides the settlement service, an ID for identifying the settlement service, or the like. An amount paid by the settlement service is stored in "payment amount". A name of a purchased commodity or a name of a purchased service is stored in the "commodity name/service name". The purchase history DB shown in FIG. 4 is only an example. Items not shown in FIG. 4 may be included in the purchase history DB or only a part of the information shown in FIG. 4 may be absent.

(2) Configuration of the Terminal

The terminal 120 includes an input and output I/F 321, a communication I/F 322, a control unit 323, and a storing unit 324. The input and output I/F 321 and the communication I/F 322 respectively correspond to the input and output I/F 204 and the communication I/F 205 shown in FIG. 2. The control unit 323 includes an acquiring unit 325, a specifying unit 326, a settlement processing unit 327, a start processing unit 328, and a UI (User Interface) unit 329. The storing unit 324 stores programs.

The acquiring unit 325 acquires, using a photographing device included in the terminal 120, an image including a two-dimensional code used for settlement. The acquiring unit 325 may be referred to as photographing unit.

The specifying unit 326 determines, on the basis of the image acquired by the acquiring unit 325, one settlement service used for settlement from a plurality of settlement services. A character string capable of specifying a settlement service is included in the two-dimensional code included in the image acquired by the acquiring unit 325. The specifying unit 326 may specify, on the basis of content of the character string obtained by reading (decoding) the two-dimensional code, a settlement service used for settlement. The specifying unit 326 may specify a settlement service used for settlement by analyzing presence or absence of characteristics corresponding to settlement services included in the image acquired by the acquiring unit 325.

The settlement processing unit 327 performs processing for transmitting the character string (settlement information) obtained by decoding the two-dimensional code to the server 110 that performs settlement processing of the settlement service specified by the specifying unit 326.

The settlement processing unit 327 may process, according to specifications of the specified settlement service, the character string (the settlement information) obtained by decoding the two-dimensional code and transmit the character string (the settlement information) after being processed to the server 110. For example, it is assumed that, according to the specifications of the settlement service, only a partial character string of the character string included in the two-dimensional code is used for the settlement processing. In this case, the settlement processing unit 327 may transmit the partial character string extracted from the character string included in the two-dimensional code to the server 110. The settlement processing unit 327 may retain specification data associated with each of settlement services, specify specification data corresponding to the settlement service specified by the specifying unit 326, and process the settlement information on the basis of the specification data.

When the specifying unit 326 cannot specify a settlement service used for settlement or when receiving, from the server 110, a notification that a settlement service used for settlement cannot be specified, the start processing unit 328 starts the Web browser in order to enable use of a settlement service. At this time, the start processing unit 328 may pass, to the Web browser, a character string obtained by reading (decoding) the two-dimensional code.

The UI unit 329 causes a display to display various screens for performing settlement processing using the settlement service. The UI unit 329 receives operation of the user on the various screens. The UI unit concerning processing for causing the display to display the various screens may be represented as a display control unit. The UI unit that receives operation of the user on the various screens may be represented as an operation receiving unit. When receiving, from the server 110, a notification that the same settlement processing is performed a predetermined number of times within a predetermined time, the UI unit 329 causes the display to display a screen indicating that the notification is received.

Operation Processing in this Embodiment

Processing performed by the communication system 1 according to this embodiment is explained. The following explanation is based on the premise that the server 110A, the server 110B, and the server 110C respectively provide a settlement service A, a settlement service B, and a settlement service C. At least information (a character string or a characteristic) capable of specifying a settlement service is included around a character string obtained by decoding a two-dimensional code or the two-dimensional code. It is assumed that the server 110 or the terminal 120, which specifies a settlement service, grasps specifications of the information in advance.

The information capable of specifying a settlement service may be, not as a limitation but as an example, a domain name (or an IP address) of the server 110 that provides the settlement service. The information capable of specifying a settlement service may be a name of a company that provides the settlement service or the settlement service or may be a logo, a color, a pattern, or the like indicating the company that provides the settlement service or the settlement service. In the latter case, a database associating the information capable of specifying the settlement service and the domain name (or the IP address) of the server 110 that provides the settlement service is stored in advance in the server 110 or the terminal 120 that specifies the settlement service. It is assumed that it is possible to, by searching through the database using the information capable of specifying the settlement service as a key, specify the domain name (or the IP address) of the server 110 that provides the settlement service.

Figure 5:
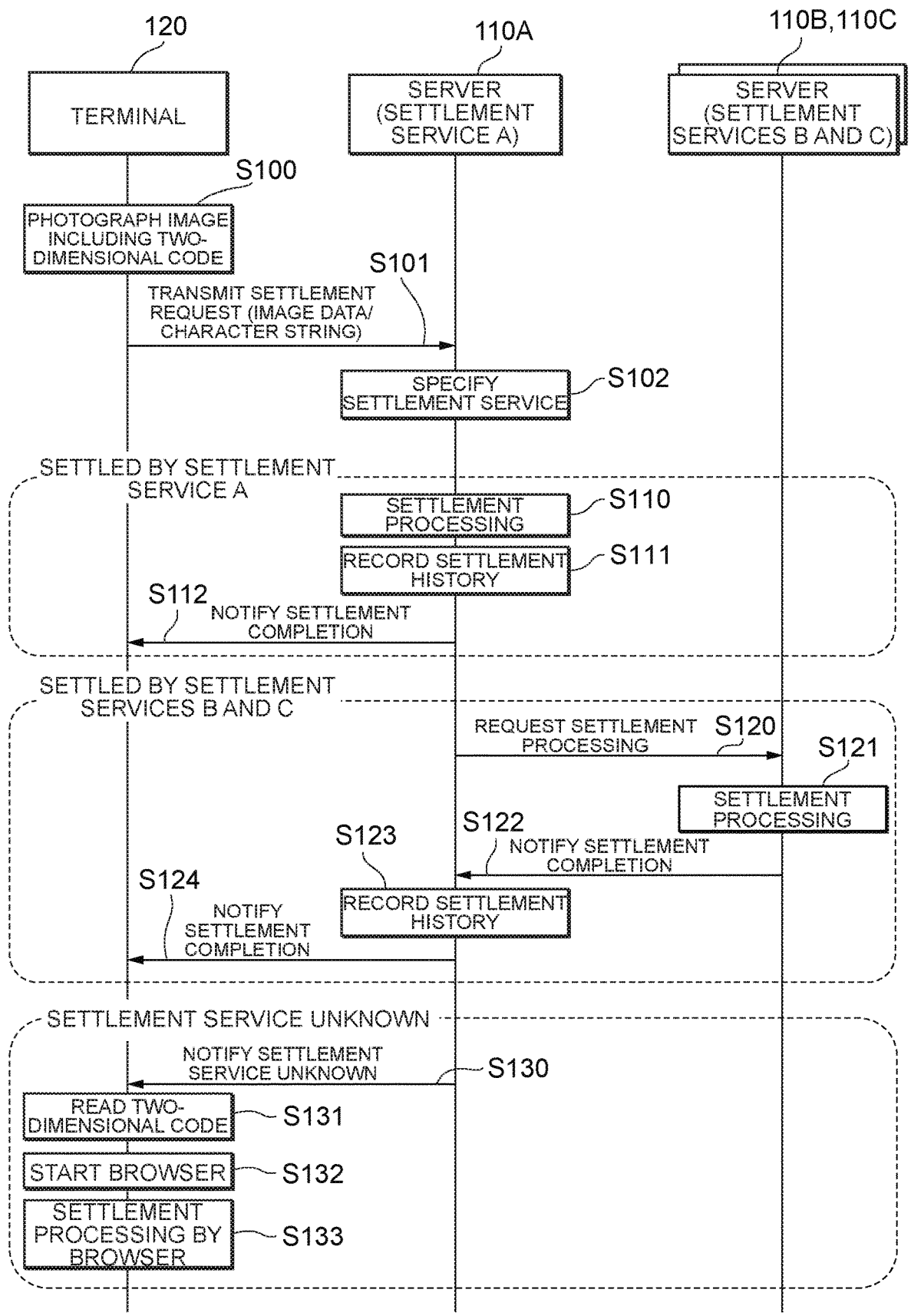
FIG. 5 shows an example of a sequence of processing performed by a communication system according to the embodiment.

FIG. 5 is a diagram showing an example of a sequence of processing performed by the communication system 1 according to this embodiment. In the sequence shown in FIG. 5, the server 110A specifies a settlement service used for settlement. In the case of the user reading-type QR settlement, the terminal 120 corresponds to the user terminal 120B. In the case of the store reading-type QR settlement, the terminal 120 corresponds to the POS terminal 120A.

First, the acquiring unit 325 of the terminal 120 photographs, in response to operation of the paying user or the charging user, an image including a two-dimensional code using a camera or a two-dimensional reading machine (S100). More specifically, in the case of the store reading-type QR settlement, the charging user operates the POS terminal 120A to photograph the two-dimensional code displayed on the user terminal 120B of the paying user. In the case of the user reading-type QR settlement, the paying user operates the user terminal 120B to photograph an image including the two-dimensional code displayed on the POS terminal 120A or a printed two-dimensional code placed in the store.

Subsequently, the acquiring unit 325 of the terminal 120 transmits, to the server 110A, a settlement request message including photographed image data or a character string obtained by decoding the two-dimensional code. The acquiring unit 315 of the server 110A acquires the image data or the character string transmitted from the terminal 120 (S101).

Subsequently, the specifying unit 316 of the server 110A performs processing for specifying a settlement service used for settlement (which may be referred to as specifying of a sorting destination) on the basis of the image data or the character string acquired in the processing procedure of step S101 (S102). When the specified settlement service is the settlement service A, the processing proceeds to a processing procedure of step S110. When the specified settlement service is the settlement service B or C, the processing proceeds to a processing procedure of step S120. The processing proceeds to a processing procedure of step S130 when information capable of specifying a settlement service is absent or when, although information capable of specifying a settlement service is present, a settlement service cannot be specified because, for example, the information capable of specifying a settlement service is information that the specifying unit 316 cannot recognize.

Concerning a method in which the specifying unit 316 specifies a settlement service used for settlement, specific examples are explained. A specifying method 1 and a specifying method 2 explained below can be applied to both of the user reading-type QR settlement and the store reading-type QR settlement.

Specifying Method 1

The specifying method 1 is a specifying method usable when a character string capable of specifying a settlement service is included in a character string obtained by decoding a two-dimensional code.

In the case of the specifying method 1, the specifying unit 316 searches for presence or absence of a character string capable of specifying a settlement service out of a character string obtained by decoding a two-dimensional code to specify a settlement service used for settlement. For example, it is assumed that a character string "A-company" is included in a two-dimensional code used for a settlement service provided by a company A, a character string "B.com" is included in a two-dimensional code used for a settlement service provided by a company B, and a character string "Cpay" is included in a two-dimensional code used for a settlement service provided by a company C. In this case, the specifying unit 316 searches whether the character string "A-company", "B.com", or "Cpay" is included in the character string obtained by decoding the two-dimensional code. If "A-company" is included in the character string, the specifying unit 316 specifies that the settlement service used for the settlement is the settlement service of the company A. Similarly, if "B.com" is included in the character string, the specifying unit 316 specifies that the settlement service used for the settlement is the settlement service of the company B. If "Cpay" is included in the character string, the specifying unit 316 specifies that the settlement service used for the settlement is the settlement service of the company C.

Specifying Method 2

Figure 6A:
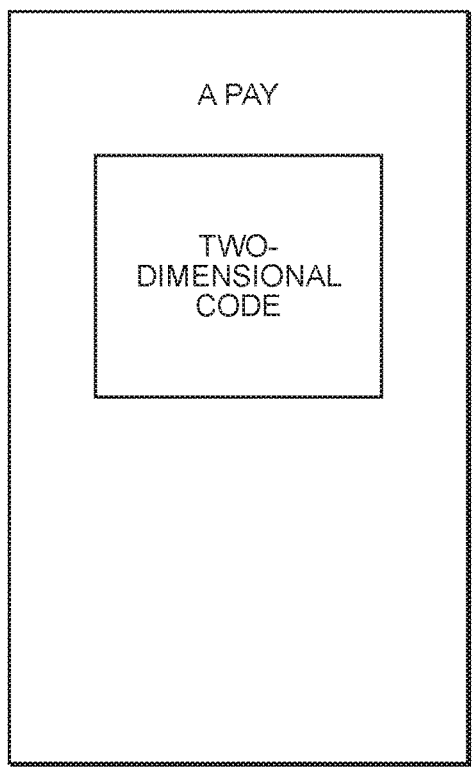
FIG. 6A shows a display example of a two-dimensional code.
Figure 6B:
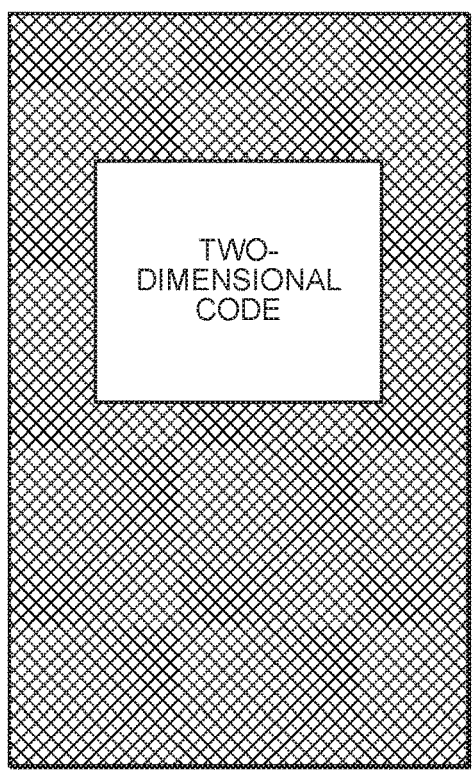
FIG. 6B shows a display example of the two-dimensional code.

The specifying method 2 is based on the premise that characteristics capable of specifying settlement services are illustrated around a two-dimensional code, for example, as shown in FIGS. 6A and 6B. FIG. 6A shows an example in which a name of a settlement service is illustrated above the two-dimensional code. FIG. 6B shows an example in which a pattern indicating a specific settlement service is drawn around the two-dimensional code.

In the case of the specifying method 2, the specifying unit 316 searches for presence or absence of characteristics corresponding to settlement services out of an image including the two-dimensional code to specify a settlement service used for settlement. For example, it is assumed that, as shown in FIG. 6A, an icon of "A pay" is displayed around the two-dimensional code used for the settlement service provided by the company A and, as shown in FIG. 6B, a check pattern is drawn around the two-dimensional code used for the settlement service provided by the company B.

In this case, concerning the image including the two-dimensional code, the specifying unit 316 analyzes presence or absence of the icon of "A pay" and presence or absence of the check pattern. When the icon of "A pay" is detected as a result of the analysis, the specifying unit 316 specifies that the settlement service used for the settlement is the settlement service of the company A. Similarly, when the check pattern is detected, the specifying unit 316 specifies that the settlement service used for the settlement is the settlement service of the company B.

When settlement is performed by the settlement service A, the settlement processing unit 317 of the server 110A performs settlement processing using a character string obtained by decoding a two-dimensional code included in image data (S110). In the settlement processing, transmission and reception of various data necessary for the settlement processing is performed between the server 110A and the terminal 120. When the settlement processing is completed, the settlement processing unit 317 stores, in the purchase history DB, information concerning the settlement performed using the settlement service A (S111) and notifies the terminal 120 that the settlement is completed (S112).

When settlement is performed by the settlement service B (or the settlement service C), the settlement processing unit 317 transmits, to the server 110B (or the server 110C), the entire or a part of a character string obtained by decoding a two-dimensional code included in image data (S120). For example, the settlement processing unit 317 may transmit, to the server 110B (or the server 110C), the entire character string obtained by decoding the two-dimensional code or may transmit, to the server 110B (or the server 110C), a character string obtained by excluding information capable of specifying a settlement service from the character string obtained by decoding the two-dimensional code.

Subsequently, the server 110B (or the server 110C) performs settlement processing using the received character string (S121). In the settlement processing, transmission and reception of various data necessary for the settlement processing is performed between the server 110B (or the server 100C) and the terminal 120. When the settlement processing is completed, the server 110B (or the server 110C) notifies the server 110A that the settlement is completed (S122). The notification may include information (date and time, a paying user, a charging user, a payment amount, a commodity name/a service name, and the like) concerning the settlement performed using the settlement service B (or the settlement service C). The settlement processing unit 317 of the server 110A stores the information concerning the settlement notified from the server 110B (or the server 110C) in the purchase history DB (S123) and notifies the terminal 120 that the settlement is completed (S124). In the processing procedure of step S123, when the information concerning the settlement performed using the settlement service B or the settlement service C is included in the settlement request message or the character string obtained by decoding the two-dimensional code received in step S101, the settlement processing unit 317 of the server 110A may store the information concerning the settlement in the purchase history DB.

When a settlement service cannot be specified, the settlement processing unit 317 notifies a message indicating that a settlement service cannot be specified to the terminal 120 (S130). The settlement processing unit 327 of the terminal 120, which receives the notification, acquires a character string by decoding the two-dimensional code (S131). Subsequently, the start processing unit 328 starts the Web browser included in the terminal 120 and instructs the Web browser to access a URL included in the acquired character string (S132). The Web browser accesses a settlement processing device indicated by the URL to display various settlement screens on the screen of the terminal 120. Subsequently, the paying user operates the various settlement screens displayed on the Web browser to complete the settlement processing (S133).

The processing procedure of step S130 to step S133 operates when a URL of the server 110 different from the server 110B and the server 110C and capable of performing settlement processing using the Web browser is stored in the character string obtained by decoding the two-dimensional code. Therefore, when such a URL is not stored in the character string obtained by decoding the two-dimensional code, the settlement processing unit 327 of the terminal 120 cannot pass the URL to the Web browser. Therefore, the settlement processing is stopped.

FIG. 7 is a diagram showing an example of a sequence of processing performed by the communication system 1 according to this embodiment. In the sequence shown in FIG. 7, the terminal 120 specifies a settlement service used for settlement. The server 110A operates as a proxy that receives a request concerning settlement processing from the terminal 120 and passes the request to the server 110B or the server 110C. It is assumed that the server 110A, the server 110B, and the server 110C respectively provide the settlement service A, the settlement service B, and the settlement service C.

A processing procedure of step S200 is the same as the processing procedure of step S100 in FIG. 5. Therefore, explanation of the processing procedure is omitted. Subsequently, the specifying unit 326 of the terminal 120 performs processing for specifying a settlement service used for settlement on the basis of the image data acquired in the processing procedure of step S200 (S201). A method of specifying a settlement service used for settlement is the same as the specifying method 1 and the specifying method 2 explained in FIG. 5. Therefore, explanation of the method is omitted.

Subsequently, the settlement processing unit 327 transmits, to the server 110A, a settlement request message including the entire or a part of a character string obtained by decoding a two-dimensional code included in image data (S202). For example, the settlement processing unit 327 may transmit, to the server 110A, the entire character string obtained by decoding the two-dimensional code or may transmit, to the server 110A, a character string obtained by excluding information capable of specifying a settlement service from the character string obtained by decoding the two-dimensional code.

When the settlement service specified by the processing procedure of step S201 is the settlement service A, the processing proceeds to a processing procedure of step S210. When the specified settlement service is the settlement service B or C, the processing proceeds to a processing procedure of step S220. When a settlement service cannot be specified, the processing proceeds to a processing procedure of step S230.

Processing procedures of step S210 to step S212 performed when the settlement is performed by the settlement service A are respectively the same as the processing procedures of step S110 to step S112 in FIG. 5. Therefore, explanation of the processing procedures is omitted.

When settlement is performed by the settlement service B (or the settlement service C), the settlement processing unit 317 of the server 110A transmits the character string received from the terminal 120 to the server 110B (or the server 110C) (S220). Processing procedures of step S221 to step S224 are respectively the same as the processing procedures of step S121 to step S124 in FIG. 5. Therefore, explanation of the processing procedures is omitted.

When a settlement service cannot be specified, the settlement processing unit 327 decodes the two-dimensional code to acquire a character string (S230). Subsequently, the start processing unit 328 starts the Web browser included in the terminal 120 and instructs the Web browser to access a URL included in the character string acquired in step S230 (S231). The Web browser accesses a settlement processing device indicated by the URL to display various settlement screens on the screen of the terminal 120. Subsequently, the paying user operates the various settlement screens displayed on the Web browser to complete the settlement processing (S232).

In the processing procedure explained above with reference to FIG. 7, the terminal 120 may directly request the server 110B or the server 110C, which provides the settlement service used for the settlement, to perform the settlement processing. That is, the server 110A may not operate as the proxy. The terminal 120 may directly request the server 110B or the server 110C to perform the settlement processing. An example of a processing procedure in this case is shown in FIG. 8

When the settlement is performed by the settlement service B (or the settlement service C), the settlement processing unit 327 of the terminal 120 transmits a character string to the server 110B (or the server 110C) (S240). At this time, the settlement processing unit 327 may start an application for settlement corresponding to the settlement service B (or the settlement service C) in the terminal 120 to execute various kinds of processing concerning the application for settlement.

Subsequently, the server 110B (or the server 110C) performs settlement processing using the received character string (S241). In the settlement processing, transmission and reception of various data necessary for the settlement processing is performed between the server 110B (or the server 110C) and the terminal 120. When the settlement processing is completed, the server 110B (or the server 110C) notifies the terminal 120 that the settlement is completed (S242).

Concerning the processing procedure of step S201 in FIG. 7, instead of specifying a settlement service by itself, the terminal 120 may request the server 110A to specify a settlement service. In this case, the terminal 120 may receive information concerning specified one settlement service from the server 110A and specify (recognize) the settlement service according to the received information. At this time, the UI unit 329 of the terminal 120 may display, on the screen, information related to the one settlement service specified by the server 110A.

First Example

A first example is an example in which the charging user or the paying user refers to the information concerning the settlement accumulated in the purchase history DB. According to the first example, there is an effect that the charging user or the paying user is capable of comprehensively referring to statistical information concerning settlement performed through a variety of settlement services.

Operation Processing in the First Example

In response to operation of the user performed in the POS terminal 120A, the notifying unit 318 of the server 110 performs processing for acquiring information concerning settlement from the purchase history DB and notifying the information to the POS terminal 120A. At this time, the user may be capable of optionally designating, from the POS terminal 120A, which item among items of the purchase history DB is extracted (filtered) and how the item is extracted (filtered). Subsequently, the UI unit 329 of the POS terminal 120A displays, on the screen, as a report, statistical information concerning settlement received from the server 110.

For example, the notifying unit 318 may extract information in a predetermined period (for example, nearest one month) among the information concerning the settlement accumulated in the purchase history DB and transmit the information to the POS terminal 120A. When extracting information concerning the settlement from the purchase history DB, if the information is extracted without specifying the paying user, the charging user can refer to statistical information concerning all purchase histories in which payment was made to the charging user.

FIG. 9A is a diagram showing an example of statistical information concerning a purchase history. FIG. 9A shows an example in which the charging user extracts a record "nn-1" in the purchase history DB to thereby generate statistical information.

For example, a transaction history in a financial service or an electronic commerce service may be recorded in the server 110 other than the purchase history by the two-dimensional code settlement. The notifying unit 318 of the server 110 may notify information (an asset balance, a debt balance, an investment state, and the like) concerning financial services and states of use of electronic commerce services used by paying users to the POS terminal 120A in addition to the information recorded in the purchase history DB.

Since the charging user is capable of referring to the statistical information concerning the purchase history, the charging user is capable of taking an action of, for example, transmitting an advertisement to a specific paying user as a sales promotion activity. The server 110 may perform the transmission of the advertisement or an external advertisement distribution server different from the server 110 may perform the transmission of the advertisement. When the server 110 performs the transmission of the advertisement, the server 110 may transmit the advertisement only when expenses concerning the advertisement transmission are paid from the charging user to a company that operates the server 110.

The notifying unit 318 of the server 110 performs processing for acquiring the information concerning the settlement from the purchase history DB and notifying the information to the user terminal 120B in response to operation of the user performed in the user terminal 120B. At this time, the user may be capable of optionally designating, from the user terminal 120B, which item among items of the purchase history DB is extracted and how the item is extracted. Subsequently, the UI unit 329 of a user terminal 120B displays the statistical information concerning the settlement received from the server 110 on a screen as a report.

For example, the notifying unit 318 may extract information in a predetermined period (for example, nearest one month) among the information concerning the settlement accumulated in the history database DB and transmit the information to the user terminal 120B. When extracting information concerning the settlement from the purchase history DB, if the information is extracted without specifying the charging user, as shown in FIG. 9B, the paying user can refer to reports concerning all purchase histories in which the paying user made payment.

An extraction method is optionally set. The statistical information may be generated by extracting only records of charging users having the same attribute from the purchase history DB. The same attribute may be any attribute. For example, the charging users having the same attribute information may be charging users including a character string "nn" (for example, a chain store having a name nn is assumed).

The notifying unit 318 may transmit the statistical information concerning the settlement accumulated in the purchase history DB to the POS terminal 120A as a periodic report (for example, every one month).

The paying user may be capable of selecting whether an advertisement based on a purchase activity of the paying user is received. The advertisement may be a coupon or the coupon may be given when reception of the advertisement is selected.

An administrator of the server 110 may be capable of optionally referring to the purchase history DB. The server 110 may calculate credibility of the paying user on the basis of the purchase history DB.

Second Example

A second example is an example in which, when detecting that the same settlement processing is requested a predetermined number of times within a predetermined time, the settlement processing unit 317 of the server 110 notifies the POS terminal 120A and/or the user terminal 120B to that effect. For example, it is conceivable that, when some error occurs in the settlement processing, the paying user or the charging user reads the same two-dimensional code many times without noticing that the two-dimensional code is invalidated. In this case, the server 110 uselessly processes the invalidated two-dimensional code many times. According to the second example, it is possible to notify the paying user or the charging user that some error occurs in the settlement processing and settlement is unsuccessful. It is possible to prevent the paying user or the charging user from reading the invalid two-dimensional code many times. Therefore, it is possible to reduce a processing load of the server 110 during abnormality occurrence.

Operation Processing in the Second Example

FIG. 10 is a diagram showing an example of operation processing in the second example. The settlement processing unit 317 of the server 110 detects that settlement by the same two-dimensional code is requested a predetermined number of times within a predetermined time from the POS terminal 120A or the user terminal 120B (S300). Subsequently, the settlement processing unit 317 transmits, to the POS terminal 120A and/or the user terminal 120B, an alert indicating that the same settlement processing is performed a predetermined number of times within the predetermined time (S301 and S303). The POS terminal 120A and/or the user terminal 120B, which receives the alert, displays the alert on the screen (S302 and S304).

The server 110 shown in FIG. 10 may include the settlement processing device that the Web browser accesses when a settlement service cannot be specified in FIGS. 5 and 7.

Third Example

A third example is an example in which, in response to operation of the paying user or the charging user, update of the two-dimensional code displayed on the screen of the POS terminal 120A or the user terminal 120B is enabled. Consequently, for example, when receiving the alert in the second example, the paying user or the charging user is capable of continuing the settlement processing by updating the two-dimensional code.

Operation Processing in the Third Example

FIG. 11 is a diagram showing an example of operation processing in the third example. The UI unit 329 of the terminal 120 (the POS terminal 120A or the user terminal 120B) receive update of the two-dimensional code (S400). Subsequently, the settlement processing unit 327 requests the server 110 to update the two-dimensional code (S401). The server 110 generates a new two-dimensional code (S402) and transmits the generated two-dimensional code to the terminal 120 (S403). The UI unit 329 of the terminal 120 updates the two-dimensional code displayed on the screen to the received two-dimensional code (S404).

What is claimed is:

1. An information processing method performed by one or more processors of a first information processing device configured to execute a first settlement processing corresponding to a first settlement service, the information processing method comprising:

electronically acquiring an information code, from a second information processing device that scans an image of the information code used for settlement processing;

in response to electronically determining that the image of the information code comprises a characteristic of the first settlement service being encoded in the information code, a text representation comprising at least part of a first character string specifying the first settlement service, an icon indicating the first settlement service, or a combination thereof:

electronically executing the first settlement processing on the basis of settlement information encoded in the information code, and electronically notifying the second information processing device that the first settlement processing is completed; and in response to electronically determining that the image of the information code comprises a characteristic of a second settlement service being encoded in the information code, a text representation comprising at least part of a second character string specifying the second settlement service, an icon indicating the second settlement service, or a combination thereof:
    electronically transmitting settlement information, encoded in the information code, to a third information processing device configured to execute the second settlement processing via the second settlement service,
    electronically receiving a notification, from the third information processing device, that the second settlement processing is completed, and
    electronically notifying the second information processing device that the second settlement processing is completed.

2. The information processing method according to claim 1, wherein the transmitting the settlement information, encoded in the information code, to the third information processing device includes:
    processing the settlement information, encoded in the information code, according to specification data associated with the second settlement service; and
    transmitting the processed settlement information to the third information processing device.

3. The information processing method according to claim 1, wherein
    the image of the information code comprises the characteristic of the first settlement service or the second settlement service being encoded in the information code, and
    the characteristic further comprising an encoded representation of at least part of the first character string specifying the first settlement service or an encoded representation of at least part of the second character string specifying the second settlement service.

4. The information processing method according to claim 1, wherein
    the image of the information code comprises the icon indicating the first settlement service or the second settlement service.

5. The information processing method according to claim 1, further comprising:
    electronically storing, in a purchase history database, information concerning at least one settlement performed using the first settlement service, the second settlement service, or a third settlement service; and
    electronically acquiring, from the purchase history database, the information concerning the at least one settlement performed using the first settlement service, the second settlement service, or the third settlement service.

6. A first information processing device configured to execute a first settlement processing corresponding to a first settlement service, the first information processing device comprising:
    a memory; and
    a processor connected to the memory and configured to perform operations comprising:
        acquiring an information code, from a second information processing device that scans an image of the information code used for settlement processing;
        in response to determining that the image of the information code comprises a characteristic of the first settlement service being encoded in the information code, a text representation comprising at least part of a first character string specifying the first settlement service, an icon indicating the first settlement service, or a combination thereof:
            executing the first settlement processing on the basis of settlement information encoded in the information code, and
            notifying the second information processing device that the first settlement processing is completed; and
        in response to determining that the image of the information code comprises a characteristic of a second settlement service being encoded in the information code, a text representation comprising at least part of a second character string specifying the second settlement service, an icon indicating the second settlement service, or a combination thereof:
            transmitting settlement information, encoded in the information code, to a third information processing device configured to execute the second settlement processing via the second settlement service,
            receiving a notification, from the third information processing device, that the second settlement processing is completed, and
            notifying the second information processing device that the second settlement processing is completed.

7. A computer-readable non-transitory storage medium storing a program for causing one or more processors of a first information processing device, to execute a first settlement processing corresponding to a first settlement service, the one or more processors of the first information processing device being, via the program, configured to perform operations comprising:
    acquiring an information code, from a second information processing device that scans an image of the information code used for settlement processing;
    in response to determining that the image of the information code comprises a characteristic of the first settlement service being encoded in the information code, a text representation comprising at least part of a first character string specifying the first settlement service, an icon indicating the first settlement service, or a combination thereof:
        executing the first settlement processing on the basis of settlement information encoded in the information code, and
        notifying the second information processing device that the first settlement processing is completed; and
    in response to determining that the image of the information code comprises a characteristic of a second settlement service being encoded in the information code, a text representation comprising at least part of a second character string specifying the second settlement service, an icon indicating the second settlement service, or a combination thereof:
        transmitting settlement information included, encoded in the information code, to a third information processing device configured to execute the second settlement processing via the second settlement service,
        receiving a notification, from the third information processing device, that the second settlement processing is completed, and
        notifying the second information processing device that the second settlement processing is completed.

8. The computer-readable non-transitory storage medium storing a program of claim 7, wherein the transmitting the settlement information, encoded in the information code, to the third information processing device includes:
- processing the settlement information, encoded in the information code, according to specification data associated with the second settlement service; and
- transmitting the processed settlement information to the third information processing device.

9. The computer-readable non-transitory storage medium storing a program of claim 7, wherein
- the image of the information code comprises the characteristic of the first settlement service or the second settlement service being encoded in the information code, and
- the characteristic further comprising an encoded representation of at least part of the first character string specifying the first settlement service or an encoded representation of at least part of the second character string specifying the second settlement service.

10. The computer-readable non-transitory storage medium storing a program of claim 7, wherein
- the image of the information code comprises the icon indicating the first settlement service or the second settlement service.

11. The computer-readable non-transitory storage medium storing a program of claim 7, further comprising:
- storing, in a purchase history database, information concerning at least one settlement performed using the first settlement service, the second settlement service, or a third settlement service; and
- acquiring, from the purchase history database, the information concerning the at least one settlement performed using the first settlement service, the second settlement service, or the third settlement service.

12. The first information processing device of claim 6, wherein
- the image of the information code comprises the characteristic of the first settlement service or the second settlement service being encoded in the information code, and
- the characteristic further comprising an encoded representation of at least part of the first character string specifying the first settlement service or an encoded representation of at least part of the second character string specifying the second settlement service.

13. The first information processing device of claim 6, wherein
- the image of the information code comprises the icon indicating the first settlement service or the second settlement service.

14. The first information processing device of claim 6, further comprising:
- storing, in a purchase history database, information concerning at least one settlement performed using the first settlement service, the second settlement service, or a third settlement service; and
- acquiring, from the purchase history database, the information concerning the at least one settlement performed using the first settlement service, the second settlement service, or the third settlement service.

\* \* \* \* \*